Jan. 26, 1971 W. FAUST 3,559,037
CURRENT CONVERTER ARRANGEMENT COMPRISING A PLURALITY OF
CONVERTER ELEMENTS CONNECTED IN SERIES
Filed Jan. 15, 1968 3 Sheets-Sheet 1

INVENTOR.
Werner Faust
BY
Pierce, Scheffler & Parker
Attorneys

INVENTOR.
Werner Faust

United States Patent Office 3,559,037
Patented Jan. 26, 1971

3,559,037
CURRENT CONVERTER ARRANGEMENT COMPRISING A PLURALITY OF CONVERTER ELEMENTS CONNECTED IN SERIES
Werner Faust, Wettingen, Switzerland, assignor to Aktiengesellschaft Brown, Boveri & Cie., Baden, Switzerland a joint-stock company
Filed Jan. 15, 1968, Ser. No. 697,777
Claims priority, application Switzerland, Feb. 10, 1967, 2,072/67
Int. Cl. H02m 7/22
U.S. Cl. 321—27
7 Claims

ABSTRACT OF THE DISCLOSURE

An electrical converter arrangement comprises a plurality of series-connected controllable current converter elements such as thyristors which together form one and the same path for current flow. The converter elements forming this current path are not fired simultaneously but rather are fired sequentially either singly or in groups by means of a pulse generator in cooperation with delay means interposed in the circuit connections to the various converter elements, or element groups so that the proper time delays are established for firing. By firing the converter elements in sequence, i.e. in stages, one avoids formation of undesirable steep voltage jumps. The required sequential firing delays can be obtained by use of individual delay devices having progressively longer time delays, or a ring counter can be utilized.

The present invention relates to an improvement in a converter arrangement which includes several series-connected current converter elements that form one path or arm of the converter arrangement.

Controlled current converter elements which are connected in series for reason of voltage, are controlled as far as possible simultaneously. Special measures are necessary for ensuring this simultaneity. The object of this simultaneity is to prevent the full voltage from being applied for a brief period to a few or only to one element, since this can result in undesirable breakdown of the elements.

The expenditure incurred in ensuring this simultaneity is very high, because every element has a different potential and the control impulses must be applied to elements insulatedly against each other. For this reason, different measures have been developed for ensuring the firing simultaneity, such as firing the individual elements by light signals, or by mutually well insulated, magnetically coupled coils.

However, in addition to being very expensive, these devices have also the technical disadvantage that the collapse of the voltage during the firing of the whole series is the cause of steep voltage jumps, and causes large charging current peaks in the capacitances forming part of the circuit.

These drawbacks could be avoided if it were possible to effect the control in such a way that the voltage collapses gradually. It has now been found that with thyristors a a new voltage state is established with a small time delay, because after the delivery of the control impulse, there is first formed near the control electrode a thin column of plasma between the anode and the cathode of the thyristor, until the thyristor voltage starts to collapse.

According to the invention, there is provided an electrical converter arrangement comprising a plurality of series-connected controlled current converter elements e.g. thyristors which together form all or part of one path or arm of the converter arrangement, control means for applying firing pulses to said elements, and delaying means in series between the control means and at least some of the current converter elements and so arranged that the firing of the elements takes place at different times and the series-connected current converter elements are thus firing in stages.

In this way, the aforementioned voltage jumps and charging current peaks are avoided and the voltage collapse in a current converter chain takes place in steps.

The foregoing objects and advantages will become more apparent from the following descriptions of various embodiments of the invention and from the accompanying drawings wherein:

FIG. 1 is an electrical circuit of one suitable converter arrangement to which the inventive concept of sequential firing of the controllable converter elements in accordance with the invention can be applied;

FIG. 2 is a circuit diagram of one path of the overall converter circuit depicted in FIG. 1 illustrating one embodiment for obtaining the desired sequential firing of several converter elements, these being arranged, for example, in groups which make up this particular current path, the sequential firing being attained by means of individual time delay elements correlated to the several groups and which have progressively increasing time delay characteristics;

Figure 5:
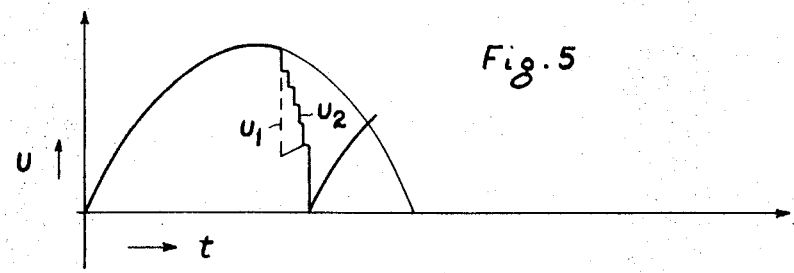
Figure 6:
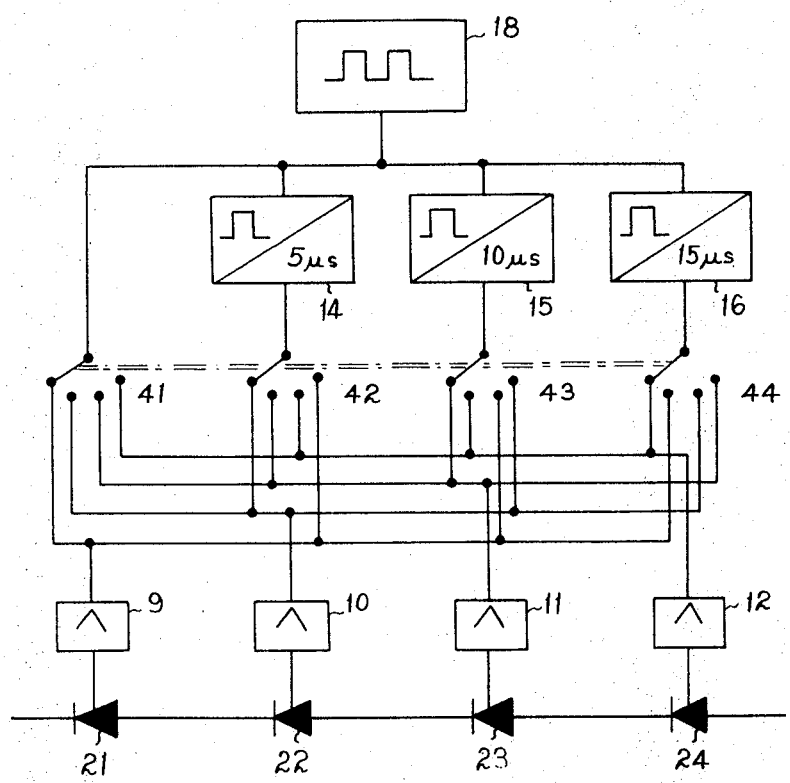

FIG. 5 is a graph which shows the rectified voltage produced by the converter elements, there being one voltage curve corresponding to the known method of firing all of the converters in one path simultaneously, and which is compared with another curve corresponding to the improved method of firing in sequentially delayed groups in accordance with the present invention; and FIG. 6 is a circuit diagram illustrating a modification for sequential firing of the controllable converter elements that includes switching means which, in cooperation with variable time delay means, enable one to change the firing order of the converter elements.

Figure 1:
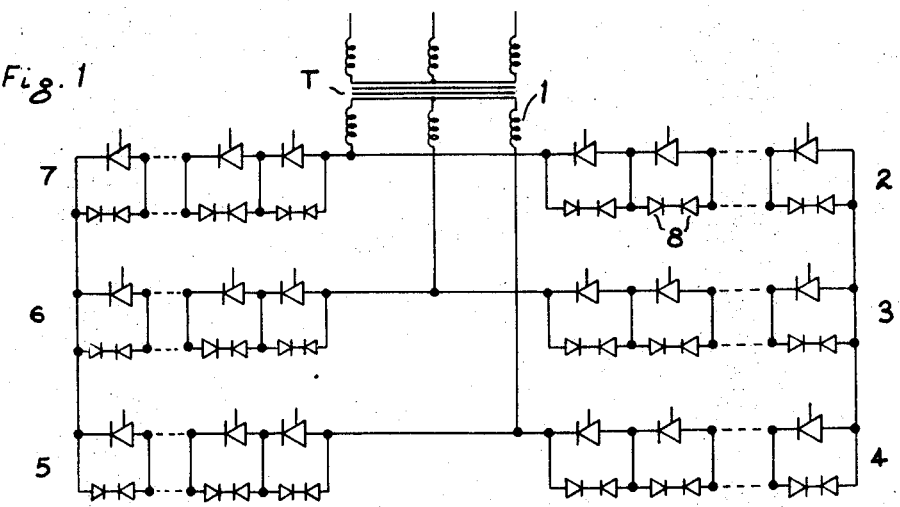

With reference now to FIG. 1, numeral 1 designates the secondary side of the supply transformer T. The current converter elements, i.e. thyristors are arranged in a bridge circuit, as known in the art; the individual bridge arms are shown at 2 to 7. Each arm comprises several series-connected thyristors in parallel with each of which are connected two oppositely poled voltage-limiting diodes 8 in series.

The thyristors of each bridge arm receive control signals, which have hitherto been given simultaneously, but which according to the present invention are arranged to cause successive firing of the thyristors in groups at short intervals.

Figure 2:
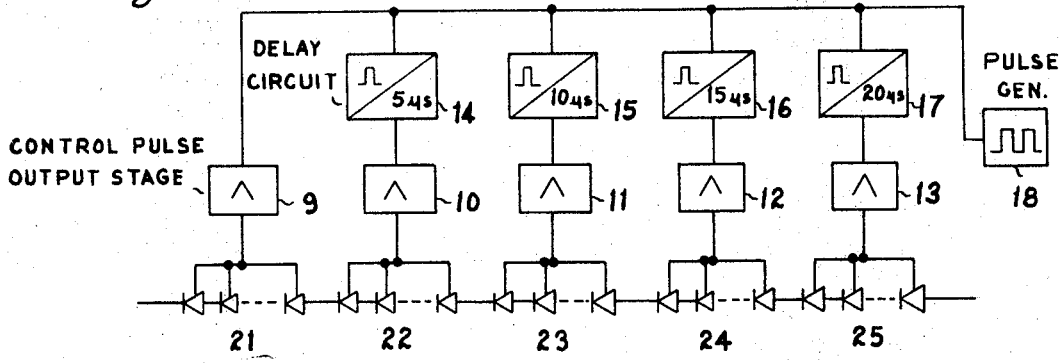
Figure 3:
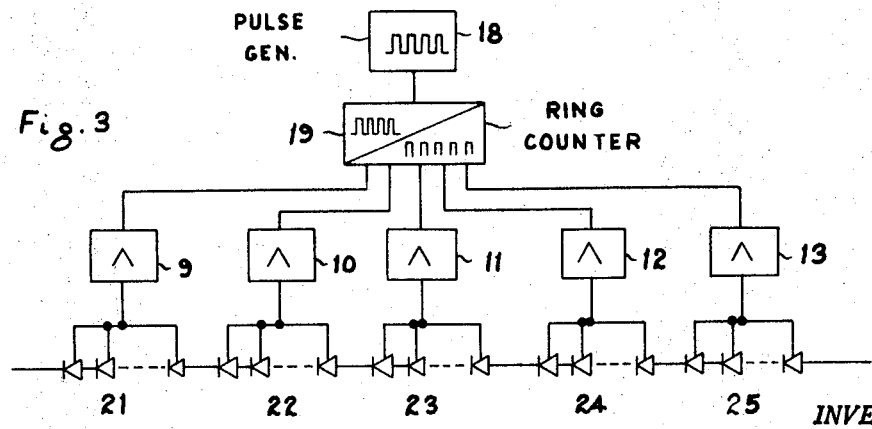
FIG. 3 is a circuit diagram similar to FIG. 2 illustrating a somewhat different embodiment wherein the desired sequential firing of several groups of converter elements is obtained by a ring counter to which all groups are connected.
Figure 4:
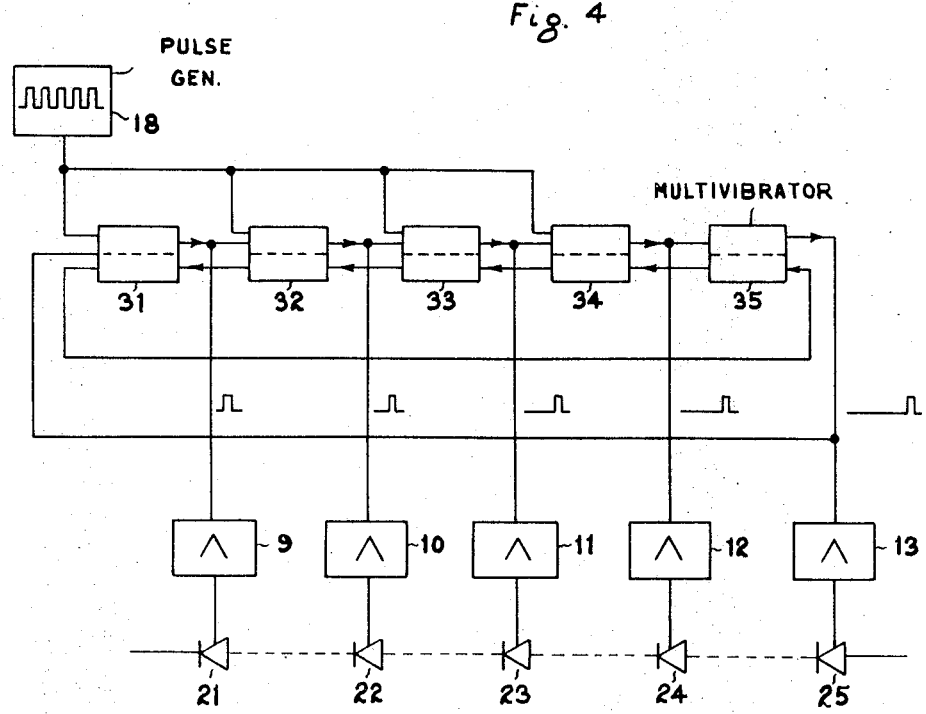
FIG. 4 is a circuit diagram similar to FIG. 3 illustrating a modification of the latter wherein the ring counter is composed of a plurality of individual counters, e.g. bistable multivibrator units which are associated respectively with the groups of converter elements.

Control arrangements are shown in greater detail in FIGS. 2 to 4, from which the parallel connected current limiter diodes 8 have been omitted. FIG. 2 shows a single bridge arm, for example, the arm 2, consisting of five groups 21 to 25, each with ten thyristors of which only the first two and the last have been depicted. All thyristors of one group receive a common control signal from the control pulse output stages 9 to 13. These pulses, delivered from the output stages to the control electrodes of the thyristors, are relatively delayed. The delaying devices, which are of known kind, are shown at 14 to 17. The output stage 9 is not delayed, the stage 10 may be delayed, for example, by 5µs, the stage 11 by 10 µs, stage 12 by 15 μs and stage 13 by 20 μs; these values are merely given by way of example. It will be seen that in this example the last group 25 receives a control pulse 20 microseconds later than the first group 21. The pulses are generated in pulse generator 18, of a known type. The pulse sequence corresponds to the firing sequence of the individual thyristors so that the pulses are spaced by substantially the conduction time of the thyristors.

Naturally, the delay time may also be selected differently. It is not absolutely necessary that adjacent elements have increasing delay times. It is equally possible to fire the groups in the order 21, 25, 22, 24, and 23, and other sequences are feasible. It is also possible to arrange switches between the individual groups so that any desired time delay can be applied at choice to any group. This arrangement is shown in FIG. 6 of the drawings from which it will be seen that a plurality of simultaneously actuatable switches 41 to 44 interposed between the time delay devices 14, 15 and 16 and the converter groups 21 to 24 serve to selectively connect different ones of the variable time delay devices 14–16 to different ones of the converter groups 21–24 dependent upon the positions of the switches.

FIG. 3 shows an arrangement in which the pulse generator 18 generates a pulse train per firing sequence. In this drawing, reference numeral 19 signifies a ring counter which transmits the pulses individually and successively, first to the stage 9, then to the stage 10 and so on. Also here, the thyristor groups 21 and 25 are fired with intervals of a few microseconds one after the other. The number of pulses in one train corresponds to the number of thyristor groups fired at different times.

The ring counter may be so connected that after each pulse train a different group of thyristors is fired first. This has the advantage that all groups of thyristors are uniformly used. This circuit is shown in greater detail in FIG. 4, in which the thyristor groups are shown again in a simplified manner at 21 to 25, and are controlled by the output stages 9 to 13. Each end stage receives pulses from a ring counter consisting of individual counting elements, e.g. bistable multivibrators 31 to 35. Whilst in the arrangement of FIG. 3 the number of pulses from the generator is equal to the number of groups to be controlled, so that the group 21 is always controlled first and the group 25 always last, in the arrangement of FIG. 4 the pulse generator 18 must produce with every control pulse train one pulse more than there are groups. The process is then as follows:

The first impulse is applied to the open bistable counting element 31. The pulse passes therethrough and reaches the output stage 9. At the same time, the pulse causes the bistable counting element 32 to open, and this opening closes the preceding bistable counting element 31. This is indicated by arrows. The next pulse can only pass through the counting element 32 and fire the thyristor group 22 via the output stage 10, the counting element 33 being opened, and 32 again blocked. This sequence continues until, for example, the fifth pulse reaches the output stage 13. This pulse opens again the counting element 31. However, now a further pulse reaches the arrangement and finds the counting element 31 open. Although this causes a firing pulse to be applied again to the output stage 9 and thereby to the group 21, this group has already been fired and nothing happens. However, this pulse causes the element 31 to be again blocked and the element 32 to be opened. During the next pulse series, the first pulse encounters the element 32 open and passes therethrough via the output stage 10 to the thyristor group 22, so that this group is fired first. The next following pulse then fires the thyristor group 23 via output stage 11 and so on, and the previously first group 21 is now fired as last group. Then an idle pulse is again applied to the group 22, and the ring counter is again advanced through one step so that during the next pulse sequence, the firing sequence starts with group 23. In this way, all the groups are stressed uniformly.

FIG. 5 shows the rectified voltage U at a current converter element as a function of time $t$. The dashed curve $U_1$ shows the firing process with simultaneous firing of all elements, as has been the practice hitherto. The solid curve $U_2$ shows firing by steps. It may be seen that this makes possible a gradual transition during commutation such that sudden collapeses of the voltage do not occur and voltage peaks in the inductances, as well as current peaks in capacitances belonging to the converter circuit, can be avoided.

I claim:
1. An electrical converter arrangement comprising a plurality of series-connected controllable current converter elements which together form all or a part of one arm of the converter arrangement, a pair of oppositely poled diodes connected in parallel with each of said converter elements, control means for applying firing pulses to each of said current converter elements, and time delay devices having different delay characteristics connected in series with said control means for at least some of said converter elements thereby effecting a controlled sequential firing of said converter elements in stages dependent upon the time delay characteristic of each said delay device.

2. A converter arrangement as claimed in claim 1, in which at least one current converter element is connected directly to said control means and elements are connected to said control means through said time delay devices which have increasingly larger delay times.

3. A converter arrangement as claimed in claim 1, in which the difference in the delay times differs in magnitude from stage to stage.

4. A converter arrangement as claimed in claim 1, in which the current converter elements are combined in groups, the elements in a group having the same delay times.

5. A converter arrangement as claimed in claim 1, in which said control means is constituted by a pulse generator, and a ring counter is provided to distribute the generated pulses successively to the individual current converter elements.

6. A converter arrangement as claimed in claim 5, in which in each firing sequence said pulse generator generates a pulse train which is larger by one than the number of stages, and the last pulse of the train advances the ring counter by one step so that the next firing sequence starts with a current converter element different from that fired first in the preceding firing sequence order.

7. A converter arrangement as defined in claim 1 and which further includes selective switching means interposed between said time delay devices and said converter elements for selectively connecting different ones of said time delay devices to different ones of said converter elements.

References Cited

UNITED STATES PATENTS

| 3,304,484 | 2/1967 | Kernick et al. | 307—223X |
| 3,122,695 | 2/1964 | Meissen | 321—27X |
| 3,250,919 | 5/1966 | Maass | 323—9X |
| 3,287,576 | 11/1966 | Motto, Jr, | 321—27(UX) |
| 3,267,290 | 8/1966 | Diebold | 307—88.5 |
| 3,401,326 | 9/1968 | Hunter | 321—11X |
| 3,405,344 | 10/1968 | Boksjo et al. | 321—11 |

J D MILLER, Primary Examiner

G. GOLDBERG, Assistant Examiner

U.S. Cl. X.R.

307—223, 269, 293, 296; 323—25, 34